United States Patent [19]

Murphy

[11] 4,187,203

[45] Feb. 5, 1980

[54] POLYAMINE-CHROMIC ACID IONIC POLYMERS AND AQUEOUS CATIONIC ELECTROCOAT SYSTEMS CONTAINING THE SAME

[75] Inventor: Edward J. Murphy, Mt. Prospect, Ill.

[73] Assignee: DeSoto, Inc., Des Plaines, Ill.

[21] Appl. No.: 924,569

[22] Filed: Jul. 14, 1978

[51] Int. Cl.$^2$ .......................... C09D 5/08; C09D 5/40
[52] U.S. Cl. ............................. 260/18 N; 204/181 C
[58] Field of Search ............ 204/181 C; 260/438.5 R, 260/18 N

[56] References Cited

U.S. PATENT DOCUMENTS

| | | | |
|---|---|---|---|
| 3,175,964 | 3/1965 | Watanabe et al. | 204/181 C |
| 3,787,463 | 1/1974 | Zuntini et al. | 260/438.5 R |
| 3,891,527 | 6/1975 | Sekmakas | 204/181 C |
| 3,896,017 | 7/1975 | Sekmakas | 204/181 C |
| 3,928,157 | 12/1975 | Suematsu et al. | 204/181 C |
| 3,954,588 | 5/1976 | Hazan et al. | 204/181 C |
| 3,963,663 | 6/1976 | Sekmakas | 204/181 C |
| 4,042,544 | 8/1977 | Simon | 260/438.5 R |

*Primary Examiner*—Ronald W. Griffin
*Attorney, Agent, or Firm*—Dressler, Goldsmith, Clement, Gordon & Shore, Ltd.

[57] ABSTRACT

There is disclosed an aqueous cationic electrocoating bath adapted to electrodeposit films at the cathode which cure to provide enhanced corrosion protection in which the bath contains an amine-functional resin dispersed therein with the aid of a solubilizing acid together with a polyamine-chromic acid ionic polymer formed by reacting a water insoluble polyamine with from about 50 to about 95 equivalent percent of a chromic acid. The ionic polymer is used in an amount to supply from about 25 to about 1000 parts of detectable chromate per million of said bath.

8 Claims, No Drawings

POLYAMINE-CHROMIC ACID IONIC POLYMERS AND AQUEOUS CATIONIC ELECTROCOAT SYSTEMS CONTAINING THE SAME

DESCRIPTION

Technical Field

The present invention relates to polyamine-chromic acid ionic polymers and to aqueous cationic electrocoat systems containing the same so as to electrodeposit films which cure to provide enhanced corrosion protection.

Background art

The utilization of active pigments to enhance corrosion protection is itself well known, and efforts have been made to incorporate these pigments into aqueous electrocoat systems, but with only limited success. This is because the active pigments normally used are excessively soluble in the aqueous electrocoating bath, which contaminates the bath with various ions. Typical active pigments used for corrosion protection are strontium chromate, barium chromate, basic lead silicochromate, basic lead silicate, barium metaborate, and zinc phosphate.

The difficulties introduced by the incorporation of these well known active pigments into aqueous electrocoating baths are numerous. Examples of the problems are difficulty in pigment dispersion, increased bath conductivity, increased gassing at the electrodes, reduced rupture voltages, bath instability, roughness of deposited films, craters and other defects in the cured film. The use of these active pigments has also frequently involved the use of special resins and additives to aid in pigment dispersion and bath stabilization.

This invention is particularly applicable to cationic electrocoating systems where the coater has already opted to employ the more expensive cationic polymers in order to maximize corrosion resistance. The problems introduced by the presence of active pigments as discussed previously are particularly acute in cationic systems where the acidic nature of the electrodeposition bath greatly increases the solubility of most of the corrosion inhibiting pigments.

Disclosure of invention

In accordance with this invention, a polyamine-chromic acid ionic polymer is formed by reacting a water insoluble polyamine with from about 50 to about 95 equivalent percent of aqueous chromic acid. This ionic polymer is used in an amount to provide from about 25 to about 1000 parts of detachable chromate per million of an aqueous cationic electrocoating bath adapted to electrodeposit films at the cathode which cure to provide enhanced corrosion protection. These aqueous baths comprise an amine-functional resin dispersed with the aid of a solubilizing acid. In preferred practice the polyamine is a diamine containing at least one hydrocarbon substituent having from 6-44 carbon atoms, and is most preferably a diamine in which each amine group is a primary amine.

Two reactants are combined to form the polyamine-chromic acid ionic polymer which is used herein. The first reactant is aqueous chromic acid (H$_2$CrO$_4$) which provides the chromate ion. The second reactant is a water insoluble polyamine which is preferably a diamine containing at least one hydrocarbon substituent having from 6-44 carbon atoms as noted above. These amines may contain primary, secondary or tertiary amine groups, through primary amines are preferred.

Organic amines are conveniently formed from the corresponding organic acid. As a matter of interest, the conversion of carboxylic acids to amines can be carried out in various ways, as is known. One simple way is to react the carboxylic acid with ammonia to form the corresponding amide. This amide is then reduced with hydrogen to form the corresponding amine. Alternatively, the amide can be dehydrated to form a nitrile which can be reduced to form the amine. The hydrocarbon group in the polyamine is thus preferably the hydrocarbon group which is obtained by dimerizing or trimerizing the following fatty acids: capric acid, lauric acid, myristic acid, palmitic acid, stearic acid, arachidic acid, behenic and lignoceric acid. The unsaturated fatty acids that are derived from commercially available oils are especially useful, such as: palmitoleic acid, oleic acid, erucic acid, ricinoleic acid, linoleic acid, linolenic acid, licanic acid, myristoleic acid, eleostearic acid, arachidonic acid, and clupanodonic acid. As will be evident, the fatty acid can be either saturated or unsaturated. When the fatty acid is unsaturated, it can be dimerized by consuming some of this unsaturation. Saturated fatty acids can be converted to the corresponding monoamines and used in combination with the polyamines. It is also convenient to obtain the fatty groups from commercially available fats and oils such as caster oil, coconut oil, corn oil, cottonseed oil, linseed oil, oiticica oil, perilla oil, poppyseed oil, rapeseed oil, safflower oil, soybean oil, sunflower oil, tall oil, tung oil, walnut oil, herring oil, menhaden oil, and sardine oil.

The preferred amines are diprimary amines having the formula:

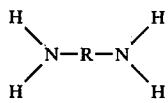

where R is a divalent hydrocarbon group having from 6-44 carbon atoms. A preferred diprimary amine is provided when R is derived from dimerized fatty acids, soya being illustrative. A commercial material of this type is Kenamine DP3680 (Humko Scheffield Company). When the amino hydrogen atoms are replaced by methyl or other alkyl groups, we have secondary and tertiary amines which are also useful. These dimerized fatty acids can be reacted with excess diamine to provide amine-terminated diamides known as "Versamides" which are also useful. One may also convert saturated dicarboxylic acids to the corresponding diamines. Thus, adipic acid can be converted to hexamethylenediamine. Other dicarboxylic acids useful herein, after conversion to the corresponding diamine, are suberic acid, azelaic acid, sebacic acid and the phthalic acids. Other polyamines, such as polyoxypropylene diamine, or the triamine counterpart of trimellitic acid, may also be used.

The interaction between the polyamine and the chromic acid forms a polyamine-chromic acid ionic polymer which locks up the chromate anion to minimize ionic contamination of the bath. Indeed, excess water is expelled by the water swollen liquid resins which are preferably formed.

The formation of the ionic polymer is carried out by mixing the reactants in aqueous medium. Enough water to dissolve the chromic acid is all that is needed. The water provided by 5% chromic acid is usually accepted. In preferred practice, the reactants are combined by slowly adding an aqueous solution of chromic acid to the water insoluble polyamine with stirring. The polyamine is a clear liquid and so is the aqueous chromic acid, and the initial mixture is also clear. When enough acid has been added, the mixture becomes opaque (though it remains fluid), and this opaque mixture is useful until so much acid is present as to provide detrimental free acidity. After opacity is first reached, the addition of acid causes thickening and the preferred product is a water swollen liquid polymer which is added to the resin solutions which are incorporated in the electrocoating bath. The mixture is made as thick as is consistent with easy handling, and it is the preassociation of the liquid polymer with the solutions of amine resin which allows it to be dispersed in the aqueous bath.

The interaction between the chromic acid and the polyamine is based upon the association of two amine groups with one molecule of chromic acid. The chromic acid is used in an amount of about 50 to about 95 equivalent percent, preferably from 55-70 equivalent percent. With too little acid, some of the polyamine remains free and a polymer does not form. With too much acid, free chromic acid becomes available which lowers bath pH, increases conductivity, and makes the bath corrosive.

The ionic polymer is employed to provide from about 25 to about 1000 parts of chromate per million of the bath, but preferably is in the range of from 50-500 parts of chromate per million of the bath.

The aqueous electrocoating baths used in this invention are conventional with the exception of the polyamine-chromic acid ionic polymer additive. Thus, an amine-functional resin is dispersed in water with the aid of a solubilizing acid and the resin solids content is adjusted to the range of about 5 to about 25% solids, more usually 7-15% solids. The solubilizing acids are themselves well known, and dimethylol propionic acid will be used as illustrative. The bath pH can broadly range from about 3 to about 8, but a pH in the range of about 5 to about 7 is preferred. It is usual, though not necessary, to use a curing reactant together with the amine-functional resin, and aminoplast resins illustrated herein by a water dispersible benzoguanamine-formaldehyde condensate will be used as illustrative. These are used in amounts of from 5-50% of total resin solids. Also, the amine-functional resins are frequently prepared in watermiscible organic solvent solution and the solvents in water-miscible organic solvent solution and the solvents in amounts of from 25% to 150% of the weight of the amine-functional resin are usually present in the bath to facilitate stable dispersion of the resin therein. Pigments for coloration, such as titanium dioxide, are also optionally present.

The above conventional factors are well known in the art and are discussed in U.S. Pat. Nos. 3,891,527, 3,896,017, and 3,963,663.

Best Mode For Carrying Out The Invention

The following examples culminate in the production of a typical cationic electrocoat bath employing an illustrative polyamine-chromic acid ionic polymer, all parts herein being by weight unless otherwise stated.

EXAMPLE 1

40.0 parts of a 10% solution of chromic acid in deionized water (0.068 equivalents) are slowly added with constant stirring to 40.0 parts of diprimary diamine based on dimerized soya fatty acids which provides 0.11 equivalents of amine. The commercial product Kenamine DP3680 having an amine equivalent weight of 368 may be used. This provides a smooth uniform paste containing about 62 equivalent percent of chromic acid.

EXAMPLE 2

In a reaction flask, 845 grams of 2-butoxy ethanol are heated to 115° C. A premix is made of 355 grams of styrene, 495 grams of butyl acrylate, 166 grams of dimethyl aminoethyl methacrylate, 23 grams t-butyl perbenzoate polymerization catalyst, and 15 grams of t-dodecyl mercaptan chain terminator. This premix is added to the hot 2-butoxy ethanol over a 3 hour period at 115° C., and the reaction mixture is held at this temperature for an additional hour. Then 5 grams of t-butyl perbenzoate are added and the mixture held for another hour and then 5 more grams are added and the mixture is held for yet another hour at 115° C. The product is a copolymer solution having the following characteristics:

nonvolatile solids—54%
viscosity (Gardner)—$Z_3$
amine value—58

EXAMPLE 3

359 parts of the amine copolymer solution of Example 2, 113 parts of benzoguanamine-formaldehyde crosslinking agent (85% solids in isopropanol), 17 parts of dimethylol propionic acid and 24 parts of the paste of Example 1 are mixed together and 164 parts of titanium dioxide rutile pigment paste (48% pigment, 10% amine copolymer solution of Example 2, 1.8% dimethylol propionic acid, balance isopropanol) are ground into the mixture. Deionized water is then added to provide 4000 parts of aqueous dispersion having a solids content of about 10%. The amine copolymer is about 60% neutralized and provides a bath pH of 6.1 and a chromate concentration of about 300 parts per million of bath. The pigment to binder ratio is 0.25/1 and the bath has a conductivity of 725 micromhos.

An identical bath was prepared without the ionic polymer paste.

Untreated cold rolled steel panels were electrodeposited from the respective baths to provide coatings having a film thickness of 0.5 mil and the coated panels were cured by baking 20 minutes at 400° F. Without the ionic polymer, the cured films when cut to the substrate with a knife and subjected to a 5% salt fog for 120 hours showed extensive corrosion extending to about 3/16 inch away from the cut. In the presence of 300 ppm of chromate supplied by the ionic polymer, very little corrosion occured and it in no place extended more than 1/16 inch away from the cut.

I claim:

1. An aqueous cationic electrocoating bath adapted to electrodeposit films at the cathode which cure to provide enhanced corrosion protection, comprising an aqueous bath having an amine-functional resin dispersed therein with the aid of a solubilizing acid, and a polyamine-chromic acid ionic polymer formed by mixing a water insoluble polyamine with from about 50 to about 95 equivalent percent of aqueous chromic acid, said ionic polymer providing from about 25 to about 1000 parts of chromate per million of said bath.

2. An electrocoating bath as recited in claim 1 in which said polyamine is a diamine containing at least one hydrocarbon substituent having from 6–44 carbon atoms.

3. An electrocoating bath as recited in claim 2 in which said polyamine is based on dimerized fatty acid.

4. An electrocoating bath as recited in any of claims 1, 2 or 3 in which the ionic polymer contains 55–70 equivalent percent of chromic acid.

5. An electrocoating bath as recited in claim 4 in which said polyamine is a diprimary diamine containing a single hydrocarbon substituent having from 6–44 carbon atoms.

6. An electrocoating bath as recited in claim 4 in which said ionic polymer is in the form of a water-swollen liquid polymer.

7. An electrocoating bath as recited in claim 1 in which said ionic polymer is present in an amount providing from 50–500 parts of chromate per million of said bath.

8. An electrocoating bath as recited in claim 1 in which said ionic polymer contains 55–70 equivalent percent of chromic acid.

* * * * *